US010330962B1

(12) United States Patent
Calvo et al.

(10) Patent No.: US 10,330,962 B1
(45) Date of Patent: Jun. 25, 2019

(54) PATTERNED ACCUMULATION MODE CAPACITIVE PHASE SHIFTER

(71) Applicant: Ciena Corporation, Hanover, MD (US)

(72) Inventors: Nicolás Abadía Calvo, Ville de Québec (CA); Luhua Xu, Montreal (CA); David Patel, Montreal (CA); David V. Plant, Montreal (CA); Mahdi Parvizi, Ottawa (CA); Naim Ben-Hamida, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/955,271

(22) Filed: Apr. 17, 2018

(51) Int. Cl.
*G02F 1/025* (2006.01)

(52) U.S. Cl.
CPC .......... *G02F 1/025* (2013.01); *G02F 2201/30* (2013.01); *G02F 2202/104* (2013.01); *G02F 2203/50* (2013.01)

(58) Field of Classification Search
None
See application file for complete search history.

(56) References Cited

U.S. PATENT DOCUMENTS

| 4,787,691 A * | 11/1988 | Lorenzo | G02F 1/025 257/80 |
| 6,166,846 A | 12/2000 | Maloney | |
| 6,845,198 B2 | 1/2005 | Montgomery et al. | |
| 6,870,969 B2 * | 3/2005 | Liu | G02F 1/025 257/79 |
| 7,657,130 B2 | 2/2010 | Shastri et al. | |
| 2006/0063679 A1 * | 3/2006 | Yue | G02F 1/025 505/190 |
| 2007/0297709 A1 * | 12/2007 | Montgomery | G02F 1/025 385/2 |
| 2008/0112032 A1 * | 5/2008 | Vlasov | G02F 1/025 359/248 |
| 2010/0215309 A1 | 8/2010 | Shubin et al. | |

(Continued)

FOREIGN PATENT DOCUMENTS

WO     2015161207 A1     10/2015

OTHER PUBLICATIONS

L. Pavesi et al.; "Silicon Fundamentals for Photonics Applications"; Silicon Photonics, Topics in Applied Physics, vol. 94, Springer-Verlag Berlin, Heidelberg; 2004 (52 pages).

(Continued)

*Primary Examiner* — Michael Stahl
(74) *Attorney, Agent, or Firm* — Clements Bernard Walker PLLC; Christopher L. Bernard; Lawrence A. Baratta, Jr.

(57) ABSTRACT

A semiconductor waveguide device includes a first semiconductor layer having a first surface, wherein the first surface comprises a first protrusion and a second protrusion collectively forming a first trench in the first semiconductor layer, a second semiconductor layer having a second surface opposing the first surface of the first semiconductor layer, and an insulator layer disposed between and in contact with the first surface and the second surface, wherein the first semiconductor layer, the second semiconductor layer, and the insulator layer form a semiconductor waveguide region, and wherein the first trench is configured to confine a mode of light beam propagation in the semiconductor waveguide region.

20 Claims, 8 Drawing Sheets

(56) References Cited

U.S. PATENT DOCUMENTS

| | | | | |
|---|---|---|---|---|
| 2011/0176762 | A1* | 7/2011 | Fujikata | G02F 1/025 385/2 |
| 2011/0311178 | A1* | 12/2011 | Fujikata | G02F 1/025 385/2 |
| 2012/0257850 | A1* | 10/2012 | Fujikata | G02F 1/025 385/3 |
| 2013/0064491 | A1* | 3/2013 | Fujikata | G02F 1/025 385/2 |
| 2015/0212344 | A1* | 7/2015 | Patel | G02B 6/132 385/2 |
| 2016/0109732 | A1 | 4/2016 | Manouvrier et al. | |

OTHER PUBLICATIONS

E. Agrell et al.; "Roadmap of optical communications"; Journal of Optics 18 (6) 063002; 2016 (41 pages).

D. Miller et al.; "Device Requirements for Optical Interconnects to CMOS Silicon Chips"; Optical Society of America, PMB3; 2010 (1 page).

R. A. Soref et al.; "Electrooptical Effects in Silicon"; IEEE Journal of Quantum Electronics, vol. 23, No. 1, pp. 123-129; 1987 (7 pages).

S. Akiyama et al., "Compact PIN-Diode-Based Silicon Modulator Using Side-Wall-Grating Waveguide"; , IEEE Journal of Selected Topics in Quantum Electronics, vol. 19, No. 6, pp. 74-84; 2013 (11 pages).

T. Baba et al.; "Efficient 50-Gb/s Silicon Microring Modulator Based on Forward-biased pin Diodes"; IEEE, International Group IV Photonics Conference; 2013 (2 pages).

D. Patel et al.; "Design, analysis, and transmission system performance of a 41 GHz silicon photonic modulator" Optics Express, vol. 23, No. 11, pp. 14263-14287; 2015 (25 pages).

D. Patel et al.; "Silicon Photonic Segmented Modulator-Based Electro-Optic Dac for 100 Gb/s PAM-4 Generation"; IEEE Photonics Technology Letters, vol. 27, No. 23, pp. 2433-2436; 2015 (4 pages).

A. Samani et al.; "A Low-Voltage 35-GHz Silicon Photonic Modulator-Enabled 112-Gb/s Transmission System"; IEEE Photonics Journal, vol. 7, No. 3, pp. 1-13; 2015 (14 pages).

A. Samani et al.; "A Silicon Photonic PAM-4 Modulator Based on Dual-Parallel Mach-Zehnder Interferometers"; IEEE Photonics Journal, vol. 8, No. 1, pp. 1-10; 2016 (11 pages).

A. Liu et al.; "A high-speed silicon optical modulator based on a metal-oxide-semiconductor capacitor"; Letters to Nature, vol. 427, pp. 615-618; 2004 (4 pages).

M. Webster et al.; "Low-Power MOS-Capacitor Based Silicon Photonic Modulators and CMOS Drivers"; Optical Society of America; 2015 (3 pages).

G.T. Reed et al.; "Silicon optical modulators"; Materials Today, vol. 8, Issue 1, pp. 40-50; 2005 (11 pages).

D. J. Thomson et al.; "Roadmap on silicon photonics"; Journal of Optics 18 (7) 073003; 2016 (21 pages).

P. Dong et al.; "Stocks Vector Communications Using Silicon Photonic Integrated Circuits"; Asia Communications and Photonics Conference, OSA Technical Digest, Optical Society of America, AS2F.1; 2016 (2 pages).

A. Abraham et al.; "Evaluation of the performances of a silicon optical modulator based on a silicon-oxide-silicon aapacitor"; IEEE, 11th International Conference on Group IV Photonics (GFP), Paris, pp. 3-4; 2014 (2 pages).

Lumerical Solutions, Inc.; Copyright 2003-2018 Lumerical Inc. <http://www.lumerical.com/tcad-products/device/>; Jul. 10, 2017.

Lumerical Solutions, Inc.; Copyright 2003-2018 Lumerical Inc. <http://www.lumerical.com/tcad-products/mode/>; Jul. 11, 2017.

Lumerical Solutions, Inc.; Copyright 2003-2018 Lumerical Inc. <http://www.lumerical.com/tcad-products/fdtd/>; Mar. 22, 2018.

X. Wu, et al.; "A 20Gb/s NRZ/PAM-4 1V Transmitter in 40nm CMOS Driving a Si-Photonic Modulator in 0.13um CMOS"; IEEE International Solid-State Circuits Conference; 2013 (3 pages).

B. Milivojevic et al.; "112Gb/s DP-QPSK Transmission Over 2427km SSMF Using Small-Size Silicon Photonic IQ Modulator and Low-Power CMOS Driver"; Optical Society of America; 2013 (3 pages).

M. Webster et al.; "Silicon Photonic Modulator based on a MOS-Capacitor and a CMOS Driver"; IEEE Compound Semiconductor Integrated Circuit Symposium; 2014 (4 pages).

\* cited by examiner

PATTERNED ACCUMULATION MODE CAPACITIVE PHASE SHIFTER

BACKGROUND

An optical modulator is a device which is used to modulate or manipulate properties of a beam of light. The beam may be propagated through an optical waveguide, which is a physical structure that confines and guides the propagation of an electromagnetic (EM) wave or optical signal. An optical mode, or mode, is an electromagnetic (EM) field excited in a waveguide. Silicon photonics is a photonic system using silicon as the optical medium. A silicon photonics phase shifter is a silicon photonics device that modifies the effective index of the optical mode in a waveguide upon depletion, accumulation or injection of carriers in the device structure, or upon temperature change. The modification of the carrier distribution modifies the effective index of the mode and hence, the phase. The modification of the carrier distribution may also modify slightly the absorption of the material, hence, the field is attenuated. Many existing accumulation mode phase shifters include complex features that make fabrication of such phase shifters complicated via semiconductor manufacturing processes.

SUMMARY

In general, in one aspect, the invention relates to a capacitive phase shifter device. The capacitive phase shifter device includes a first semiconductor layer having a first surface, wherein the first surface comprises a first protrusion and a second protrusion collectively forming a first trench in the first semiconductor layer, a second semiconductor layer having a second surface opposing the first surface of the first semiconductor layer, and an insulator layer disposed between and in contact with the first surface and the second surface, wherein the first protrusion corresponds to a second trench in the insulator layer, wherein the first semiconductor layer, the second semiconductor layer, and the insulator layer collectively form a semiconductor waveguide region, wherein the first semiconductor layer and the second semiconductor layer are configured to form a carrier accumulation region in response to a modulating voltage, and induce, based on the carrier accumulation region, a phase shift of a light beam propagating in the semiconductor waveguide region, and wherein the first trench and the second trench are configured to adjust a charge distribution of the carrier accumulation region and an optical electric field distribution of the light beam.

In general, in one aspect, the invention relates to a semiconductor waveguide device. The a semiconductor waveguide device includes a first semiconductor layer having a first surface, wherein the first surface comprises a first protrusion and a second protrusion collectively forming a first trench in the first semiconductor layer, a second semiconductor layer having a second surface opposing the first surface of the first semiconductor layer, and an insulator layer disposed between and in contact with the first surface and the second surface, wherein the first semiconductor layer, the second semiconductor layer, and the insulator layer form a semiconductor waveguide region, and wherein the first trench is configured to confine a mode of light beam propagation in the semiconductor waveguide region.

In general, in one aspect, the invention relates to a method for fabricating a capacitive phase shifter device. The method includes forming a first semiconductor layer having a first surface, wherein the first surface comprises a first protrusion and a second protrusion collectively forming a first trench in the first semiconductor layer, forming a second semiconductor layer having a second surface opposing the first surface of the first semiconductor layer, and disposing an insulator layer between and in contact with the first surface and the second surface, wherein the first protrusion corresponds to a second trench in the insulator layer, wherein the first semiconductor layer, the second semiconductor layer, and the insulator layer collectively form a semiconductor waveguide region, wherein the first semiconductor layer and the second semiconductor layer are configured to form a carrier accumulation region in response to a modulating voltage, and induce, based on the carrier accumulation region, a phase shift of a light beam propagating in the semiconductor waveguide region, and wherein the first trench and the second trench are configured to adjust a charge distribution of the carrier accumulation region and an optical electric field distribution of the light beam.

Other aspects of the invention will be apparent from the following description and the appended claims.

BRIEF DESCRIPTION OF DRAWINGS

Specific embodiments of the invention will now be described in detail with reference to the accompanying figures. Like elements in the various figures are denoted by like reference numerals for consistency.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1A:
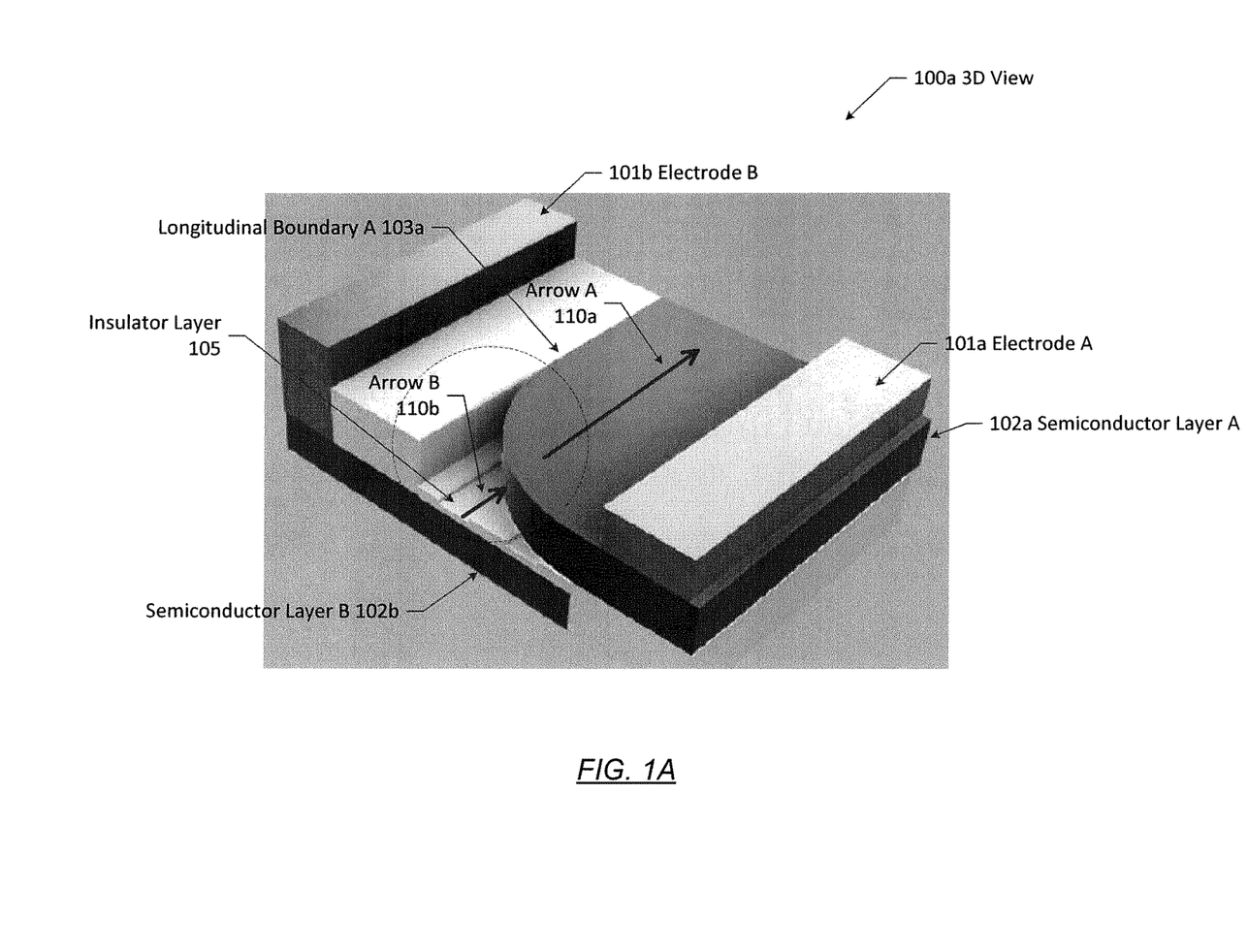
FIG. 1A shows a diagram of a three dimensional (3D) view and a cross sectional view of a patterned accumulation mode capacitive phase shifter in accordance with one or more embodiments disclosed herein.
Figure 1B:
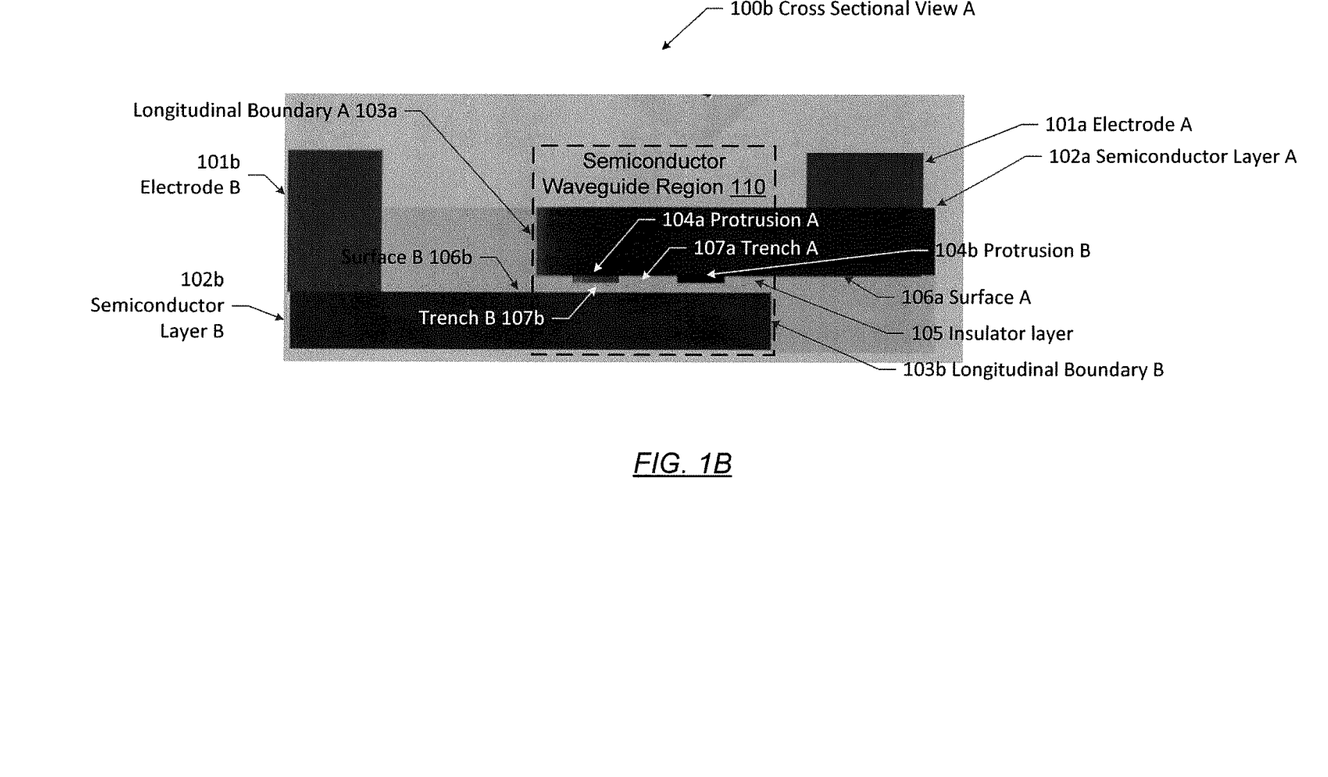
FIG. 1B shows a diagram of a cross-sectional view of a patterned accumulation mode capacitive phase shifter in accordance with one or more embodiments disclosed herein.

In general, embodiments disclosed herein relate to electro-optical phase shifters for use in optical modulators. Specifically, embodiments disclosed herein provide a patterned accumulation mode capacitive phase shifter with a grating pattern in an insulator layer. The patterned accumulation mode capacitive phase shifter has similar performance compared to existing capacitive phase shifters without the complicated features required by existing capacitive phase shifters and, therefore is easier to fabricate. Further, the patterned accumulation mode capacitive phase shifter produces less interference over adjacent components than existing capacitive phase shifters. FIG. 1A shows a diagram of a three dimensional (3D) view (100a) of a device in accordance with one or more embodiments. FIG. 1B shows a corresponding diagram of a cross sectional view A (100b) of the device depicted in FIG. 1A. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

In one or more embodiments, the device shown in FIG. 1A is a semiconductor capacitive phase shifter. In particular, the semiconductor capacitive phase shifter includes a semiconductor-insulator-semiconductor capacitor device that is configured as an optical waveguide to adjust the phase shift of a light beam propagating in the optical waveguide. In one or more embodiments, the light beam propagates along the direction marked by the arrow A (110a) in the 3D view (100a). A portion of the 3D view (100a), as identified by the dashed circle, is omitted to show the underlying structures of the insulator layer (105).

As shown in FIGS. 1A and 1B, the 3D view (100a) and the corresponding cross sectional view A (100b) depict a semiconductor layer A (102a), a semiconductor layer B (102b), and an insulator layer (105). In one or more embodiments, the semiconductor layer A (102a) is a poly-silicon layer, the semiconductor layer B (102b) is a silicon layer, and the insulator layer (105) may be made up of a suitable insulator material, such as silicon dioxide, silicon nitride, hafnium oxide, oxynitride, bismuth oxide, or any multi-layer combination thereof. In one or more embodiments, the semiconductor layer A (102a), semiconductor layer B (102b), and insulator layer (105) are disposed on and supported by a substrate, such as a semiconductor wafer or a portion of the semiconductor wafer. For example, the semiconductor layer B (102b) may be defined by or derived from a surface portion of the semiconductor wafer.

Referring to FIG. 1B, in one or more embodiments, the semiconductor layer A (102a) has a surface A (106a) with a protrusion A (104a) and a protrusion B (104b) that collectively form a trench A (107a) in semiconductor layer A (102a). Correspondingly, semiconductor layer B (102b) has a surface B (106b) opposing the surface A (106a) of semiconductor layer A (102a). Further, the insulator layer (105) is disposed between and in contact with both surface A (106a) and surface B (106b), where the protrusion A (104a) in semiconductor layer A (102a) corresponds to a trench B (107b) in the insulator layer (105). In one or more embodiments, semiconductor layer A (102a), semiconductor layer B (102b), and the insulator layer (105) collectively form a semiconductor waveguide region (110).

In one or more embodiments, semiconductor layer A (102a) and semiconductor layer B (102b) are configured to form a carrier accumulation region in response to a modulating voltage. A carrier accumulation region is a region in semiconductor layer A (102a) and semiconductor layer B (102b) where electrical charge carriers (e.g., electrons, holes, etc.) are accumulated (i.e., with increased concentration). In one or more embodiments, the carrier accumulation region is formed in proximity to surface A (106a) and surface B (106b). In one or more embodiments, semiconductor layer A (102a) and semiconductor layer B (102b) are electrically coupled to an electrode A (101a) and electrode B (101b), respectively, for receiving the modulating voltage. Accordingly, the carrier accumulation region is formed in response to the modulating voltage applied across electrode A (101a) and electrode B (101b). In this context, the semiconductor capacitive phase shifter is referred to as an accumulation mode capacitive phase shifter. An example of the carrier accumulation region in proximity to the surface A (106a) and surface B (106b) is shown in FIG. 3B.

In one or more embodiments, semiconductor layer A (102a) and semiconductor layer B (102b) are configured to induce, based on the carrier accumulation region, a phase shift of a light beam propagating in the semiconductor waveguide region (110). In particular, trench A (107a) is configured to confine a mode of light beam propagation along the direction marked by arrow A (110a) in the 3D view (100a) of FIG. 1A. In addition, trench A (107a) and trench B (107b) are configured to collectively adjust a charge distribution of the carrier accumulation region and an optical electric field distribution of the light beam. Specifically, the charge distribution changes the refractive index within the semiconductor waveguide region (110), which in turn induces changes in the optical electric field distribution of the light beam. For example, trench A (107a) is a trench in semiconductor material and corresponds to a thicker insulator region to concentrate the optical electric field distribution of the light beam, and trench B (107b) is a plain surface in the insulator material and corresponds to a thinner insulator region to concentrate the charge distribution of the carrier accumulation region. In one or more embodiments, with the trenches (107a, 107b), there may be more $SiO_2$ surface (i.e., where the charge is deposited) in the insulator layer 105 between the $SiO_2$ slot and the poly-silicon. In addition, there may also be more surface between the $SiO_2$ slot and the silicon below, thereby increasing the charge distribution in that area. An example of trench A (107a) concentrating the optical electric field distribution and the trench B (107b) concentrating the charge distribution is shown in FIG. 3B described below.

In one or more embodiments, the semiconductor waveguide region (110) is defined by an overlap between semiconductor layer A (102a) and semiconductor layer B (102b). In particular, semiconductor layer A (102a) terminates along a longitudinal boundary A (103a) of the insulator layer (105). Similarly, semiconductor layer B (102b) terminates along a longitudinal boundary B (103b) of the insulator layer (105). Accordingly, semiconductor layer A (102a) and semiconductor layer B (102b) overlap between the longitudinal boundary A (103a) and the longitudinal boundary B (103b) of the insulator layer (105).

Referring to both FIGS. 1A and 1B, in one or more embodiments, the propagation direction of the light beam (i.e., arrow A (110a)) is parallel to the longitudinal boundary A (103a) and the longitudinal boundary B (103b) of the insulator layer (105). In one or more embodiments, the longitudinal direction of trench A (107a) and trench B (107b) (i.e., arrow B (110b)) forms a pre-determined angle with the longitudinal boundary A (103a) and the longitudinal boundary B (103b) of the insulator layer (105). In other words, the trenches and the protrusion may be at any angle. For example, the pre-determined angle is depicted in FIG. 1A as 0 degrees. In other words, arrow A (110a)) is parallel to arrow B (110b). In other examples, arrow A (110a) may not be parallel to the arrow B (110b) and the pre-determined angle between the arrow A (110a) and arrow (110b) may be within a range from 0 to 90 degrees.

Although two protrusions and two trenches are described in reference to FIG. 1A and FIG. 1B above, any additional number of protrusions and trenches may be present in the semiconductor capacitive phase shifter described herein. For example, a series of protrusions and two trenches may form a grating pattern. In this context, the semiconductor capacitive phase shifter may be referred to as a patterned accumulation mode capacitive phase shifter.

Figure 1C:
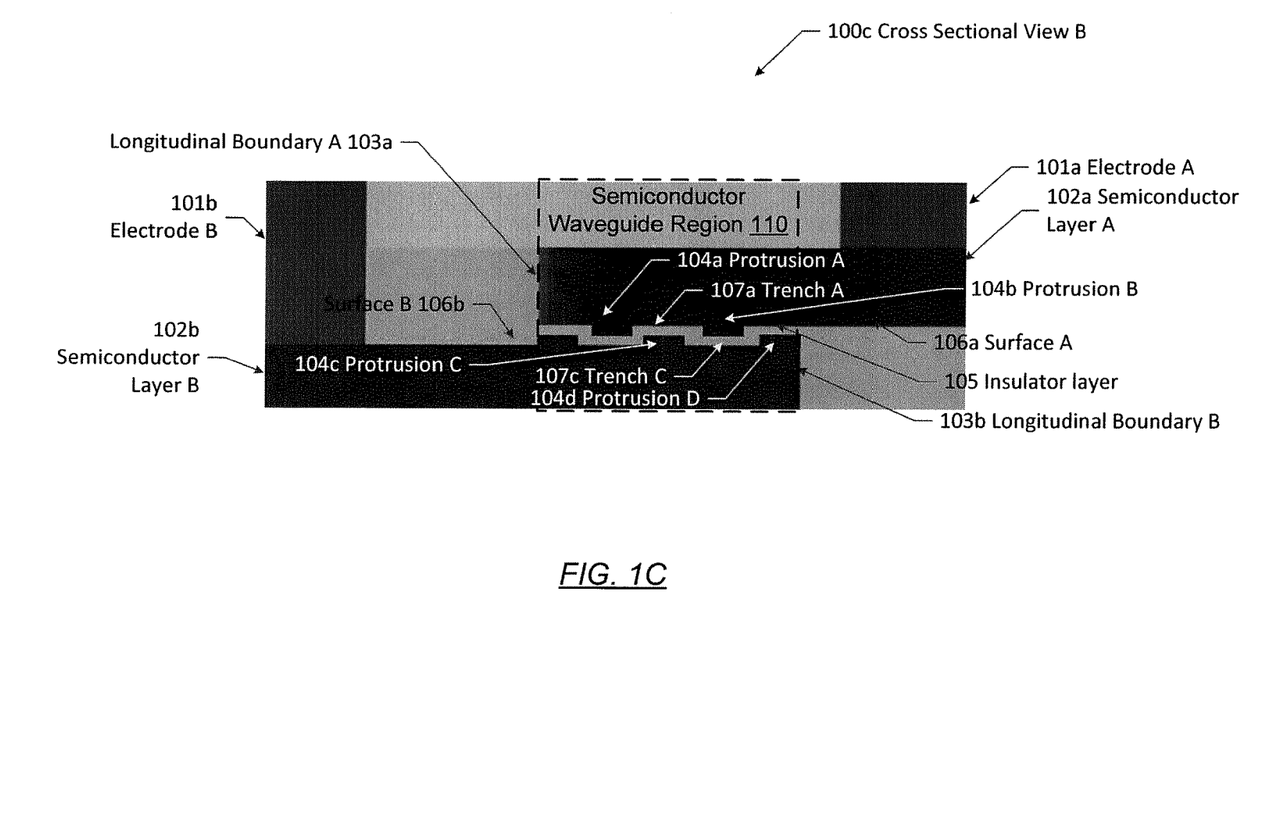
FIG. 1C shows a diagram of a cross-sectional view of a patterned accumulation mode capacitive phase shifter in accordance with one or more embodiments disclosed herein.

FIG. 1C shows a diagram of a cross sectional view B (100c) of a device in accordance with one or more embodiments disclosed herein. In one or more embodiments, one or more of the modules and elements shown in FIG. 1C may be omitted, repeated, and/or substituted. Accordingly, embodiments of the invention should not be considered limited to the specific arrangements of modules shown in FIG. 1C.

In one or more embodiments, the device shown in FIG. 1C is a variation of the semiconductor capacitive phase shifter depicted in FIG. 1A and FIG. 1B above. In particular, the cross sectional view B (100c) is substantially the same as the cross sectional view C (100b) depicted in FIG. 1B above, with additional protrusions and trenches in the semiconductor layer B (102b) within the semiconductor waveguide region (110). Specifically, the surface B (106b) of semiconductor layer B (102b) includes protrusion C (104c) and protrusion D (104d) protruding into corresponding trenches in semiconductor layer A (102a) and collectively forming a trench C (107c) in semiconductor layer B (102b). In one or more embodiments, the aforementioned protrusions and trenches maintain a thickness of the insulator layer (105) substantially constant throughout the semiconductor waveguide region (110). Although two protrusions and one trench in semiconductor layer B (102b) are described in reference to FIG. 1C above, any number of protrusions and trenches may exist in semiconductor layer B (102b) of the semiconductor capacitive phase shifter described herein.

Figure 2:
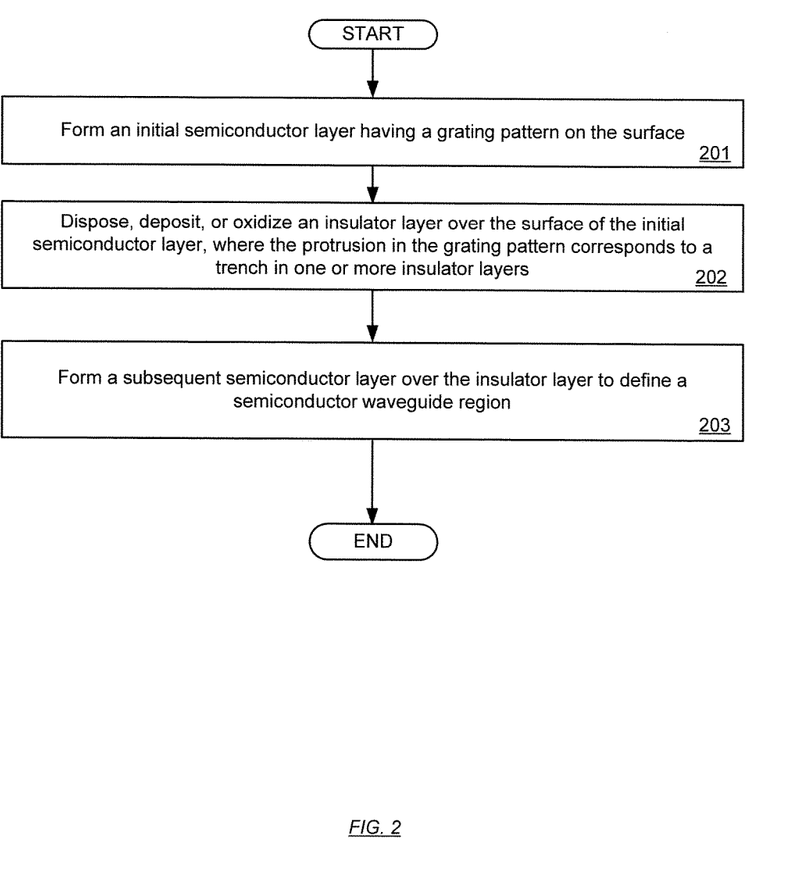
FIG. 2 shows a flowchart in accordance with one or more embodiments disclosed herein.

FIG. 2 shows a flowchart in accordance with one or more embodiments. In one or more embodiments of the invention, the process described in the flowchart of FIG. 2 may be performed to fabricate the capacitive phase shifter device depicted in FIGS. 1A and 1C above. In one or more embodiments of the invention, the process of FIG. 2 may be performed using a silicon photonic semiconductor fabrication process. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

In Step 201, an initial semiconductor layer is formed that has a grating pattern on the surface. In one or more embodiments of the invention, the initial semiconductor layer is a silicon layer at the surface of a silicon wafer where the initial semiconductor layer is terminated along an initial longitudinal boundary. In one or more embodiments, the grating pattern includes protrusions and trenches along a longitudinal direction of the grating pattern. In one or more embodiments, the protrusions and trenches are formed such that the longitudinal direction of the grating pattern forms an angle between 0 degree and 90 degrees with respect to the initial longitudinal boundary. In one or more embodiments, the protrusions and trenches are formed using an etching process step of the silicon photonic semiconductor fabrication process. Similarly, the initial semiconductor layer is terminated along the initial longitudinal boundary using a lithography process step of the silicon photonic semiconductor fabrication process. An example of the grating pattern is shown in FIG. 1C above. Embodiments disclosed herein are not limited to the example of FIG. 1C. For example, in one or more embodiments, the grating pattern is omitted from the initial semiconductor layer where the trench is formed in a subsequent insulator layer, such as the example depicted in FIG. 1B above.

In Step 202, one or more insulator layers are disposed over the surface of the initial semiconductor layer formed in the Step 201. In particular, the insulator conforms to the surface profile (i.e., protrusions and trenches) of the initial semiconductor layer. For example, the protrusion in the initial semiconductor layer corresponds to a trench in the one or more insulator layers. In one or more embodiments, the one or more insulator layers are formed using a chemical deposition process step (e.g., for depositing silicon nitride) or a thermal oxidation process step (e.g., for growing silicon dioxide) of the silicon photonic semiconductor fabrication process. Accordingly, the one or more insulator layers have a substantially constant thickness across the grating pattern. In one or more embodiments, the insulator layer has substantially uniform thickness, as shown in FIG. 1C above. In one or more alternate embodiments, the grating pattern is omitted from the initial semiconductor layer and the insulator layer is patterned to form the trench structure in a non-uniform thickness insulating layer. An example of such embodiments is shown in the FIG. 1B above.

In Step 203, a subsequent semiconductor layer is formed over the insulator layer to define a semiconductor waveguide region. In particular, the subsequent semiconductor layer conforms to the surface profile (i.e., protrusions and trenches) of the insulator layer. Based on the substantially constant thickness of the insulator layer, the surface profile of the subsequent semiconductor layer substantially matches the surface profile of the initial semiconductor layer formed in Step 201. Accordingly, the trench in the insulator layer corresponds to a protrusion in the initial semiconductor layer and the subsequent semiconductor layer, and the protrusion in the insulator layer corresponds to a trench in the subsequent semiconductor layer and the subsequent semiconductor layer.

In one or more embodiments, the subsequent semiconductor layer terminates along a subsequent longitudinal boundary that is parallel to the initial longitudinal boundary. In one or more embodiments, the subsequent semiconductor layer is formed using a chemical deposition process step (e.g., for depositing poly-silicon) of the silicon photonic semiconductor fabrication process. Similarly, the subsequent semiconductor layer is terminated along the subsequent longitudinal boundary using a lithography process step of the silicon photonic semiconductor fabrication process.

In one or more embodiments, the initial semiconductor layer and the subsequent semiconductor layer overlap between the initial longitudinal boundary and the subsequent longitudinal boundary, which are also the boundaries of the grating pattern. Accordingly, the semiconductor waveguide region is defined by the overlap between the initial semiconductor layer and the subsequent semiconductor layer. In one or more embodiments, the protrusions and trenches associated with the grating pattern are configured to propagate a light beam, in the semiconductor waveguide region, in parallel to the initial longitudinal boundary and the subsequent longitudinal boundary.

In one or more embodiments, a modulating voltage is applied across the initial semiconductor layer and the subsequent semiconductor layer. In one or more embodiments, the modulating voltage includes a direct current (DC) component to form a carrier accumulation region in the initial semiconductor layer and the subsequent semiconductor layer.

In one or more embodiments, the modulating voltage includes an alternating current (AC) component to induce, based on the carrier accumulation region, a phase shift of a light beam propagating in the semiconductor waveguide region. In one or more embodiments, the amount of phase shift is adjusted based on the magnitude of the AC component of the modulating voltage.

FIGS. 3A, 3B, 4A, and 4B show examples in accordance with one or more embodiments of the invention. The examples shown in FIGS. 3A, 3B, 4A, and 4B may be based on the semiconductor capacitive phase shifter and the method flow chart discussed in reference to FIGS. 1A, 1B, 1C, and 2 above. In one or more embodiments, one or more of the modules and elements shown in FIGS. 3A, 3B, 4A, and 4B may be omitted, repeated, and/or substituted. Accordingly, embodiments of the invention should not be considered limited to the specific arrangements of modules shown in FIGS. 3A, 3B, 4A, and 4B.

Figure 3A:
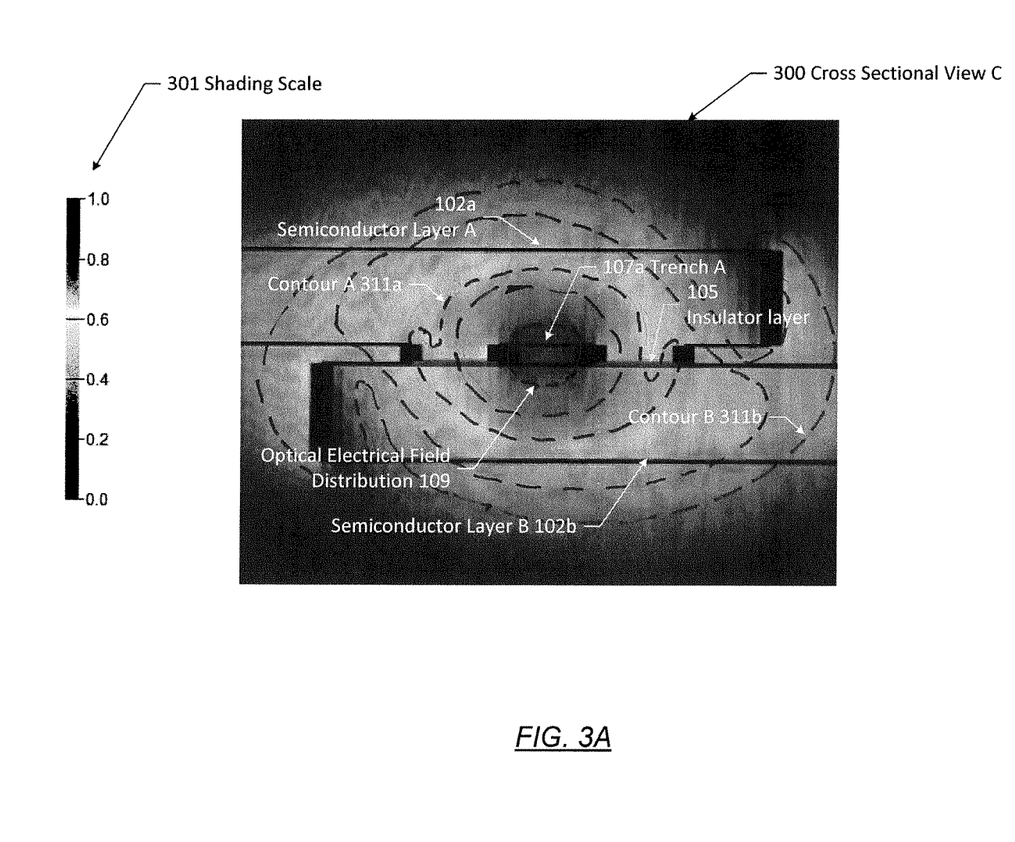
FIGS. 3A, 3B, 4A, and 4B show examples in accordance with one or more embodiments disclosed herein.
Figure 3B:
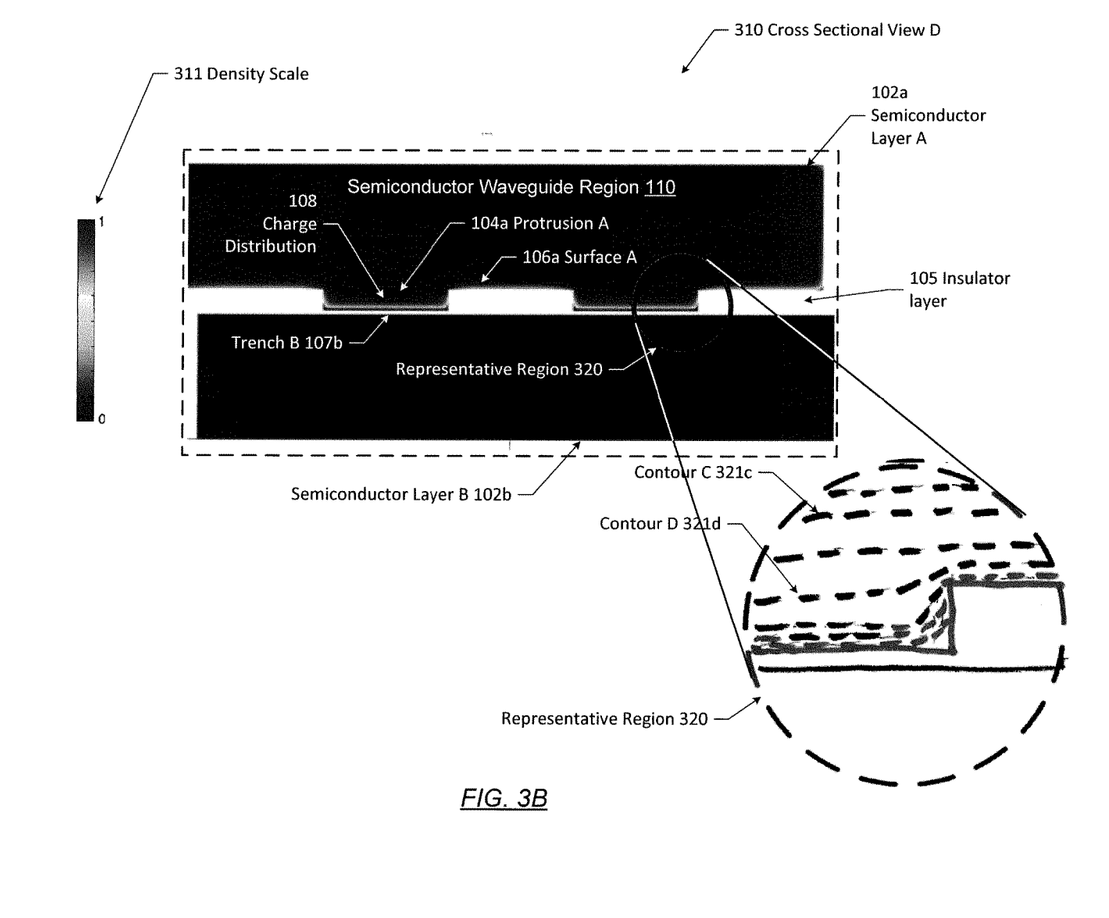

Specifically, FIGS. 3A and 3B show diagrams of cross sectional view C (300) and cross sectional view D (310) corresponding to the semiconductor waveguide region (110) depicted in FIG. 1B above. Specifically, cross sectional view C (300) of FIG. 3A shows an optical electrical field distribution (109) superimposing the semiconductor waveguide region (110). In particular, the optical electrical field distribution (109) includes equi-potential contours (e.g., contour A (311a), contour B (311b), etc.) that are represented by dashed curves. For example, the optical electrical potential changes decreases monotonically from an interior contour towards an exterior contour. In other words, the optical electrical potential associated with the contour A (311a) is higher than the optical electrical potential associated with the contour B (311b). Correspondingly, shading of the semiconductor waveguide region (110) represents, according to the shading scale (301), a field strength of the optical electrical field distribution (109). For example, the lighter shading corresponds to medium field strength while the darker shading corresponds to higher and lower field strengths. The optical electrical field distribution (109) corresponds to a mode of light beam propagation along a direction perpendicular to the cross sectional view C (300). Accordingly, cross sectional view C (300) shows how the trench A (107a) and adjacent protrusions (i.e., grating pattern) collectively confine the mode of the light beam propagation within the semiconductor waveguide region (110). In particular, as shown in FIG. 3A, darker shading in trench A (107a) in the semiconductor layer A (102a) corresponds to higher field strength and illustrates concentrating the optical electrical field distribution (109).

Cross sectional view D (310) in FIG. 3B shows a charge distribution (108) in a carrier accumulation region in the semiconductor layer A (102a). For example, according to the density scale (311), the lighter shading corresponds to medium concentration while the darker shading corresponds to higher and lower concentrations. While not explicitly shown, those of ordinary skill in the art would readily appreciate that the carrier accumulation region extends a certain depth from the surface A (106a) into the interior of the semiconductor layer A (102a) across the semiconductor waveguide region (110). The darker horizontal thin line in the charge distribution (108) corresponds to higher concentrations and represents concentrated carrier density along the protrusions (e.g., protrusion A (104a)) of the surface A (106a) due to thinner thickness of the insulator layer. A representative region (320) includes equi-density contours (e.g., contour C (321c), contour D (321d), etc.) to illustrate that the charge density decreases monotonically away from the darker horizontal thin line in the charge distribution (108). In other words, the charge density associated with the contour D (321d) is higher than the charge density associated with the contour C (321c). Accordingly, the cross sectional view D (310) shows how the trench A (107a) and adjacent protrusions (i.e., grating pattern) collectively adjust the charge distribution (108) within the semiconductor waveguide region (110). In particular, trench B (107b) in the insulator layer (105) concentrates the charge distribution (108).

Therefore, the combination of the cross sectional view C (300) and cross sectional view D (310) shows how the grating pattern adjusts the overlap between the optical electrical field distribution (109) and the charge distribution (108). In one or more embodiments, the spatial variation of the refractive index may be dependent on the charge distribution (108). Accordingly, modulation of the phase shift of the light beam may be dependent on the overlap between the optical electrical field distribution (109) and the charge distribution (108).

The patterned accumulation mode capacitive phase shifter described above may be used as a building block of an interference-based optical modulator such as a Mach-Zehnder modulator (MZM). For the high-speed integrated silicon photonic modulator, the phase shifting function is implemented by the plasma dispersion effect, where the silicon and/or poly-silicon refractive index is changed in the presence of free charge carriers. The plasma dispersion effect may be exploited in the carrier injection mode, the carrier depletion mode, and the carrier accumulation mode. The carrier accumulation mode has the advantage of high modulation efficiency while maintaining a relatively large bandwidth at the same time. Performance characteristics of the accumulation mode capacitive structures ($V_\pi L_\pi$, bandwidth, insertion loss, etc.) depend on the thickness of the insulating layer. For example, $V_\pi L_\pi$ (i.e., the product of the voltage swing and device length to achieve π radian of phase shift) may be reduced to improve the efficiency of the accumulation mode capacitive phase shifter by reducing the thickness of the insulator layer. e.g., in the trench of the insulator layer.

Figure 4A:
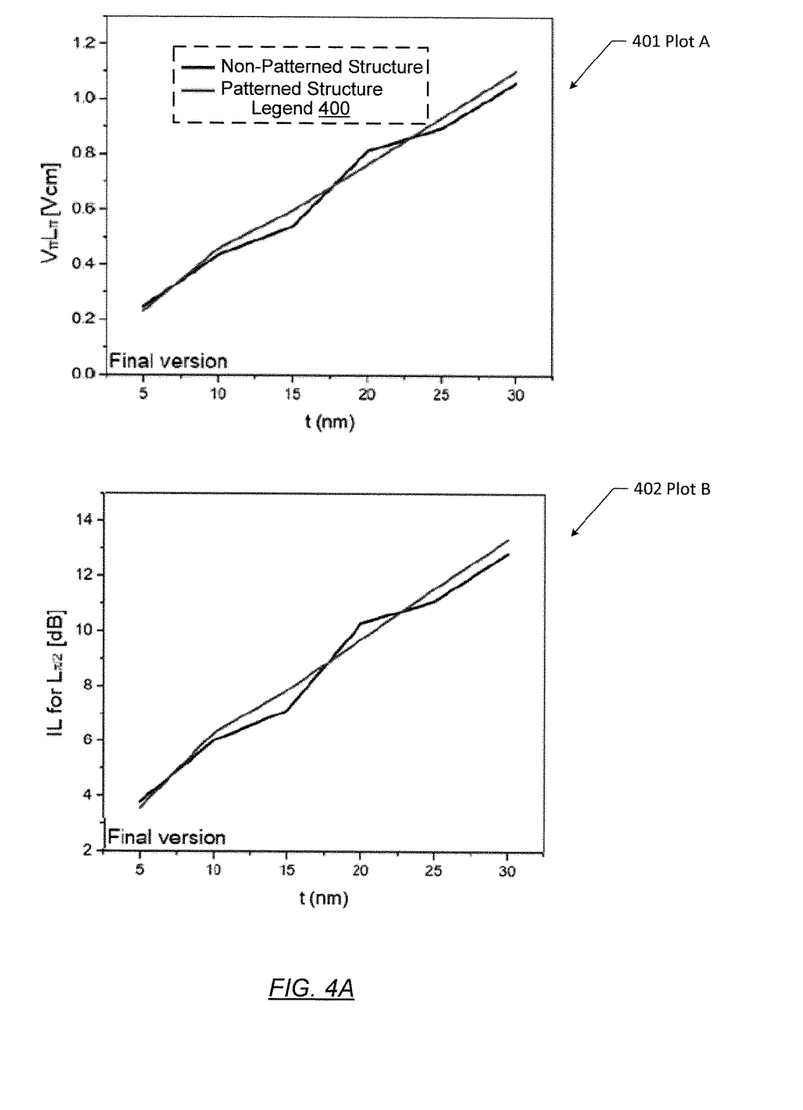
Figure 4B:
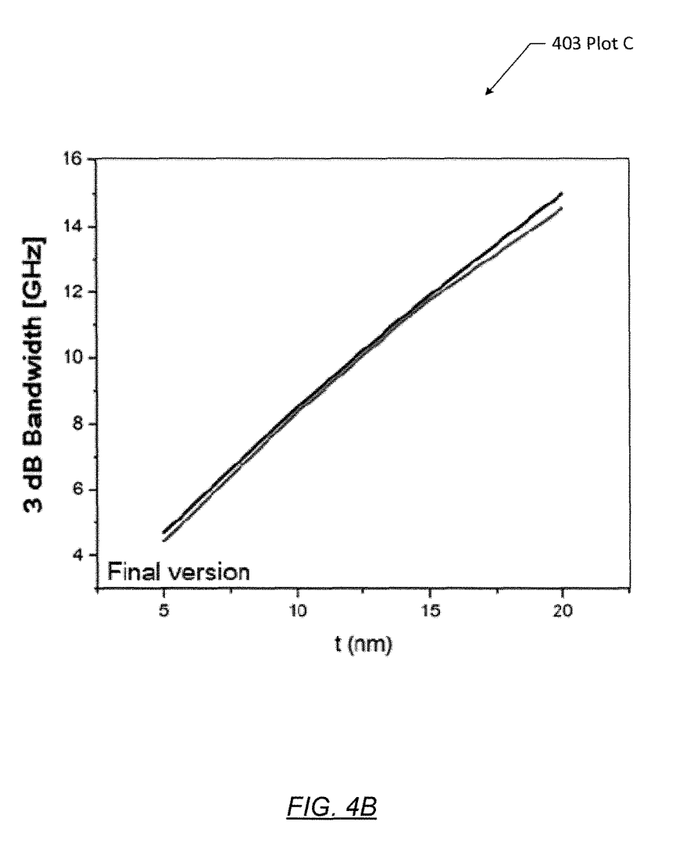

FIGS. 4A and 4B show plot A (401), plot B (402), and plot C (403) according to the legend (400). Each of plot A (401), plot B (402), and plot C (403) compares a characteristic of the accumulation mode capacitive phase shifter between a conventional non-patterned structure and the patterned structure described in FIGS. 1A-1C and 3A-3B above. Specifically, the patterned structure includes a grating pattern in the semiconductor waveguide region as described in reference to FIGS. 1A-1C and 3A-3B above. In contrast, the non-patterned structure includes a vertical structure without any grating pattern in the semiconductor waveguide region.

Plot A (401) shows simulation result of the $V_\pi L_\pi$ (along the vertical axis) versus the thickness of the insulating layer (along the horizontal axis).

Plot B (402) shows simulation result of the insertion loss along the vertical axis) versus the thickness of the insulating layer (along the horizontal axis).

Plot C (403) shows simulation result of the 3-dB bandwidth (along the vertical axis) versus the thickness of the insulating layer (along the horizontal axis).

Plot A (401), plot B (402), and plot C (403) show similar performance characteristics between the patterned structure and the non-patterned structure. Further, the patterned structure shows lower interference over adjacent component as compared to the non-patterned structure. In one or more embodiments, the patterned accumulation mode capacitive phase shifter described above is used to implement segmented modulators, optical DACs and low baud-rate modulators with the advantage of ease of manufacturing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A capacitive phase shifter device, comprising:
 a first semiconductor layer having a first surface, wherein the first surface comprises a first protrusion and a second protrusion collectively forming a first trench in the first semiconductor layer;
 a second semiconductor layer having a second surface opposing the first surface of the first semiconductor layer; and
 an insulator layer disposed between and in contact with the first surface and the second surface, wherein the first protrusion corresponds to a second trench in the insulator layer,
 wherein the first semiconductor layer, the second semiconductor layer, and the insulator layer collectively form a semiconductor waveguide region which is defined by a partial overlap where the first semiconductor layer and the second semiconductor layer each extend and there is a grating pattern in the insulator layer,
 wherein the insulator layer extends approximately to a top of the first semiconductor layer with a first width, is between and in contact with the first surface and the second surface with a second width, and extends approximately to a bottom of the second semiconductor layer with a third width, wherein the third width is smaller than the first width and the second width,
 wherein the first semiconductor layer and the second semiconductor layer are configured to:
  form a carrier accumulation region in response to a modulating voltage; and
  induce, based on the carrier accumulation region, a phase shift of a light beam propagating in the semiconductor waveguide region, and
 wherein the first trench and the second trench are configured to adjust a charge distribution of the carrier accumulation region and an optical electric field distribution of the light beam.

2. The capacitive phase shifter device of claim 1,
 wherein the first trench is configured to concentrate the optical electric field distribution of the light beam, and
 wherein the second trench is configured to concentrate the charge distribution of the carrier accumulation region.

3. The capacitive phase shifter device of claim 1,
 wherein the first semiconductor layer terminates along a first longitudinal boundary of the insulator layer,
 wherein the second semiconductor layer terminates along a second longitudinal boundary of the insulator layer, and
 wherein the first semiconductor layer and the second semiconductor layer overlap between the first longitudinal boundary and the second longitudinal boundary of the insulator layer.

4. The capacitive phase shifter device of claim 3,
 wherein the light beam propagates, in the semiconductor waveguide region, in parallel to the first longitudinal boundary and the second longitudinal boundary of the insulator layer.

5. The capacitive phase shifter device of claim 4,
 wherein the first trench has a longitudinal direction that forms a pre-determined angle with the first longitudinal boundary and the second longitudinal boundary of the insulator layer, and
 wherein the pre-determined angle is within a range of 0 to 90 degrees.

6. The capacitive phase shifter device of claim 1,
 wherein the second surface of the second semiconductor layer comprises a third protrusion protruding into the first trench in the first semiconductor layer to maintain a thickness of the insulator layer substantially constant throughout the semiconductor waveguide region.

7. The capacitive phase shifter device of claim 6,
 wherein the second surface of the second semiconductor layer further comprises a fourth protrusion,
 wherein the second protrusion corresponds to a fourth trench in the insulator layer,
 wherein the third protrusion and the fourth protrusion collectively form a third trench in the second semiconductor layer, and
 wherein the second protrusion of the first semiconductor layer protrudes into the third trench in the second semiconductor layer to further maintain the thickness of the insulator layer substantially constant throughout the semiconductor waveguide region.

8. A semiconductor waveguide device, comprising:
 a first semiconductor layer having a first surface, wherein the first surface comprises a first protrusion and a second protrusion collectively forming a first trench in the first semiconductor layer;
 a second semiconductor layer having a second surface opposing the first surface of the first semiconductor layer; and
 an insulator layer disposed between and in contact with the first surface and the second surface,
 wherein the first semiconductor layer, the second semiconductor layer, and the insulator layer form a semiconductor waveguide region which is defined by a partial overlap between the first semiconductor layer and the second semiconductor layer and there is a grating pattern in the insulator layer, wherein the insulator layer extends approximately to a top of the first semiconductor layer with a first width, is between and in contact with the first surface and the second surface with a second width, and extends approximately to a bottom of the second semiconductor layer with a third width, wherein the third width is smaller than the first width and the second width, and wherein the first trench is configured to confine a mode of light beam propagation in the semiconductor waveguide region.

9. The semiconductor waveguide device of claim 8, wherein the first semiconductor layer terminates along a first longitudinal boundary of the insulator layer, wherein the second semiconductor layer terminates along a second longitudinal boundary of the insulator layer, wherein the first semiconductor layer and the second semiconductor layer overlap between the first longitudinal boundary and the second longitudinal boundary of the insulator layer, and wherein the light beam propagates, in the semiconductor waveguide region, in parallel to the first longitudinal boundary and the second longitudinal boundary of the insulator layer.

10. The semiconductor waveguide device of claim 9, wherein the first trench has a longitudinal direction that forms a pre-determined angle with the first longitudinal boundary and the second longitudinal boundary of the insulator layer, and wherein the pre-determined angle is within a range from 0 degree to 90 degrees.

11. The semiconductor waveguide device of claim 8, wherein the second surface of the second semiconductor layer comprises a third protrusion protruding into the first trench in the first semiconductor layer to maintain a thickness of the insulator layer substantially constant throughout the semiconductor waveguide region.

12. The semiconductor waveguide device of claim 11, wherein the second surface of the second semiconductor layer further comprises a fourth protrusion, wherein the third protrusion and the fourth protrusion collectively form a second trench in the second semiconductor layer, and wherein the second protrusion of the first semiconductor layer protrudes into the second trench in the second semiconductor layer to further maintain the thickness of the insulator layer substantially constant throughout the semiconductor waveguide region.

13. A method for fabricating a capacitive phase shifter device, comprising:

forming a first semiconductor layer having a first surface, wherein the first surface comprises a first protrusion and a second protrusion collectively forming a first trench in the first semiconductor layer;

forming a second semiconductor layer having a second surface opposing the first surface of the first semiconductor layer;

disposing an insulator layer between and in contact with the first surface and the second surface, wherein the first protrusion corresponds to a second trench in the insulator layer; and defining a semiconductor waveguide region by a partial overlap between the first semiconductor layer and the second semiconductor layer and there is a grating pattern in the insulator layer;

wherein the first semiconductor layer, the second semiconductor layer, and the insulator layer collectively form the semiconductor waveguide region, wherein the insulator layer extends approximately to a top of the first semiconductor layer with a first width, is between and in contact with the first surface and the second surface with a second width, and extends approximately to a bottom of the second semiconductor layer with a third width, wherein the third width is smaller than the first width and the second width, wherein the first semiconductor layer and the second semiconductor layer are configured to:
 form a carrier accumulation region in response to a modulating voltage; and
 induce, based on the carrier accumulation region, a phase shift of a light beam propagating in the semiconductor waveguide region, and wherein the first trench and the second trench are configured to adjust a charge distribution of the carrier accumulation region and an optical electric field distribution of the light beam.

14. The method of claim 13, further comprising:

terminating the first semiconductor layer along a first longitudinal boundary of the insulator layer; and terminating the second semiconductor layer along a second longitudinal boundary of the insulator layer, and wherein the first semiconductor layer and the second semiconductor layer overlap between the first longitudinal boundary and the second longitudinal boundary of the insulator layer so as to propagate the light beam, in the semiconductor waveguide region, in parallel to the first longitudinal boundary and the second longitudinal boundary of the insulator layer.

15. The method of claim 14, wherein the first trench has a longitudinal direction that forms a pre-determined angle with the first longitudinal boundary and the second longitudinal boundary of the insulator layer, and wherein the pre-determined angle is within a range from 0 degree to 90 degrees.

16. The method of claim 13, wherein the second surface of the second semiconductor layer comprises a third protrusion and a fourth protrusion, wherein the third protrusion protrudes into the first trench in the first semiconductor layer and collectively forms, with the fourth protrusion, a second trench in the second semiconductor layer, wherein the second protrusion of the first semiconductor layer protrudes into the second trench in the second semiconductor layer, and wherein the first protrusion, the second protrusion, the third protrusion, the fourth protrusion, the first trench, and the second trench collectively maintain a thickness of the insulator layer substantially constant throughout the semiconductor waveguide region.

17. The method of claim 16, wherein forming the second semiconductor layer comprises an etching operation to form the second trench in the second semiconductor layer, wherein disposing the insulator layer comprises depositing, subsequent to the etching operation, insulating material onto the second surface of the second semiconductor layer such that the insulator layer conforms to a surface profile defined by the third protrusion, the second trench, and the fourth protrusion of the second surface, wherein forming the first semiconductor layer comprises depositing, subsequent to the depositing the insulating material, semiconductor material onto a top surface of the insulator layer, the top surface opposing the second surface across the insulator layer, and wherein the first protrusion, the first trench, and the second protrusion of the first surface are formed based on the surface profile of the insulator layer.

18. The capacitive phase shifter device of claim 1, wherein the grating pattern in the insulation layer is formed based on associated protrusions and trenches in the first semiconductor layer and the second semiconductor layer.

19. The capacitive phase shifter device of claim 1, wherein the grating pattern confines a mode of light beam propagation in the semiconductor waveguide region.

20. The capacitive phase shifter device of claim 1, wherein the grating pattern adjusts charge distribution in the semiconductor waveguide region.

* * * * *